(12) United States Patent
Knapton, III (10) Patent No.: US 6,363,486 B1
(45) Date of Patent: Mar. 26, 2002

(54) METHOD OF CONTROLLING USAGE OF SOFTWARE COMPONENTS

(75) Inventor: Kenneth S. Knapton, III, Pleasant Grove, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/092,632

(22) Filed: Jun. 5, 1998

(51) Int. Cl.[7] .................................................. H04L 9/00
(52) U.S. Cl. ....................... 713/200; 380/201; 380/202; 705/51; 705/57; 705/58; 713/202
(58) Field of Search ................................. 713/200, 201, 713/202, 190, 193; 380/4, 25, 49, 202, 44; 705/51, 55–56, 57, 59, 58

(56) References Cited

U.S. PATENT DOCUMENTS

| | | | | |
|---|---|---|---|---|
| 4,471,163 A | * | 9/1984 | Donald et al. ................. | 705/55 |
| 5,287,408 A | * | 2/1994 | Samson ......................... | 705/59 |
| 5,394,469 A | * | 2/1995 | Nagel et al. ................. | 713/200 |
| 5,457,746 A | * | 10/1995 | Dolphin ......................... | 705/57 |
| 5,542,045 A | * | 7/1996 | Levine ......................... | 395/186 |
| 5,694,469 A | * | 12/1997 | LeRue ......................... | 705/56 |
| 5,708,709 A | | 1/1998 | Rose et al. | |
| 5,774,544 A | * | 6/1998 | Lee et al. .................... | 713/193 |
| 5,784,460 A | * | 7/1998 | Blumenthal et al. ......... | 713/200 |
| 5,790,663 A | | 8/1998 | Lee et al. | |
| 5,818,936 A | | 10/1998 | Mashayekhi | |
| 5,819,091 A | | 10/1998 | Arendt et al. | |
| 5,887,065 A | * | 3/1999 | Audebert ...................... | 713/172 |
| 5,892,905 A | | 4/1999 | Brandt et al. | |
| 6,073,122 A | * | 6/2000 | Wool ............................ | 705/51 |

OTHER PUBLICATIONS

PCT Search Report dated Oct. 22, 1999. International application No.: PCT/US99/11106.

* cited by examiner

Primary Examiner—Gail Hayes
Assistant Examiner—Ho S. Song
(74) Attorney, Agent, or Firm—Steven P. Skabrat (57) ABSTRACT

Controlling the usage of a software component by an application program in an end user computer system includes obtaining an identifier of the application program by a controller computer system and generating a first password from the received application program identifier and an identifier of the component. The component, the component's identifier and the first password are communicated to the end user computer system. The component is registered with the application program as a "snap-in" or "plug-in" component. The application program generates a second password from the application program identifier and the received component identifier, compares the first password and the second password, and allows use of the "snapped-in" component by the application program on the end user computer system when the first password matches the second password.

24 Claims, 5 Drawing Sheets

METHOD OF CONTROLLING USAGE OF SOFTWARE COMPONENTS

BACKGROUND

1. Field

The present invention relates generally to object oriented programming and object security and, more specifically, to a method for controlling the use of software components with an application program in a computer system.

2. Description

Creation of software as individually marketed object oriented programs or components is a recent trend being embraced by many software developers. A software component is a portion of software that is intended to inter-operate with other software, such as an application program. In some cases, the software component is developed independently from the application program. Developers want to provide greater flexibility with their application programs by structuring portions or features of the software as separate components. This allows the end user to license only those features that the end user desires.

Some components are written using a well-known technology called ActiveX controls. ActiveX controls are a subset of component object module (COM) technology developed by Microsoft Corporation. COM technology may be written in one of several object oriented programming languages such as C++, Java, and Visual Basic, for example. ActiveX controls are typically linked or "plugged in" to a portion of an application program called a control container. An ActiveX control registers itself for use by an application program running on a computer system. In systems executing versions of the Windows operating system, commercially available from Microsoft Corporation, a database called a registry is used to store registration information for authorized components. The registry provides a way for a component, such as an ActiveX control, to advise the application program about the component's functionality. The registry typically includes information which identifies particular components, such as global unique identifiers (GUIDs), category identifiers (CATIDs), and class identifiers (CLSIDs).

Access to a component, such as a COM object, for example, may be obtained through a source code interface definition called a layer class. The layer class provides an interface between the application program and the component (which may be an ActiveX control, for example). A GUID is typically "hard-coded" or preset into a given layer class. Additional components may be coupled or "plugged in" to an application program that may already have one or more components. A plug-in component is said to be "source compatible" if a new version of the component works unchanged in an application program, but the application program must typically be rebuilt. That is, the application program may be recompiled and re-linked before the application program executes with the functionality provided by the new component.

The use of components in this software architecture model presents problems for software developers when they try to market and license the individual components. Currently, there are at least three main approaches used by developers to structure and license application programs having one or more components. In a first approach, an application program may be partitioned into components at the source code level. In many cases, the components may be combined with the application program in various ways. This results in a different "build" or release of the software for each new combination. Hence, as the number of component and application program combinations increases, the number of different versions grows rapidly, thereby increasing the cost to distribute and support the software. In a second approach, an application program uses dynamic link library (DLL) files to implement the components. A major disadvantage to the use of DLL files is that DLL files are typically not registered by an end user and may easily be copied from one computer system to another. In a third approach, an application program uses component object modules (COM) or a similar technology to register the components, as discussed above for ActiveX controls. However, these objects may also easily be copied from one computer system to another.

These approaches do not provide adequate protection from unauthorized use of a developer's software by limiting application programs to inter-operate only with licensed versions of the developer's components. Therefore, what is needed is a method for ensuring that unlicensed copies of software components cannot operate with associated application programs.

SUMMARY

An embodiment of the present invention is a method of generating a password for controlling usage of a software component by an application program. A first key is created from an identifier of the application program, a second key is created from an identifier of the component, and the password is created from the first and second keys.

Another embodiment of the present invention is a method of controlling the usage of a software component with an application program in a computer system. The method includes obtaining an identifier of the application program and generating a first password from the application program identifier and an identifier of the component. The method also includes registering the component with the application program, generating, by the application program, a second password from the application program identifier and the component identifier, comparing the first password and the second password; and allowing use of the component with the application program on the computer system when the first password matches the second password.

BRIEF DESCRIPTION OF THE DRAWINGS

The features and advantages of the present invention will become apparent from the following detailed description of the present invention in which.

DETAILED DESCRIPTION

In the following description, various aspects of the present invention will be described. For purposes of explanation, specific numbers, systems and configurations are set forth in order to provide a thorough understanding of the present invention. However, it will also be apparent to one skilled in the art that the present invention may be practiced without the specific details. In other instances, well known features are omitted or simplified in order not to obscure the present invention.

An embodiment of the present invention is a method of controlling the use of software components in a computer system by protecting them with encrypted passwords. This allows software developers to independently market software components for use in a variety of application program configurations. With the embodiments of the present invention, application programs may be divided into components and may provide a secure capability for "plug-in" or "snap-in" of the components. Preferably, all of these components are licensed by the end-user prior to distribution. The components may be distributed and licensed separately or collectively. Embodiments of the present invention ensure that a component functions only with the application program that has the license number that was provided when the component was licensed. If another copy of the application program attempts to access the component (e.g., the component was copied to another computer system having an application program with a different license number), the component will not be snapped in. In this case, the component will not be recognized by the application program and will not appear to the end user as a feature of the application program.

Figure 1:
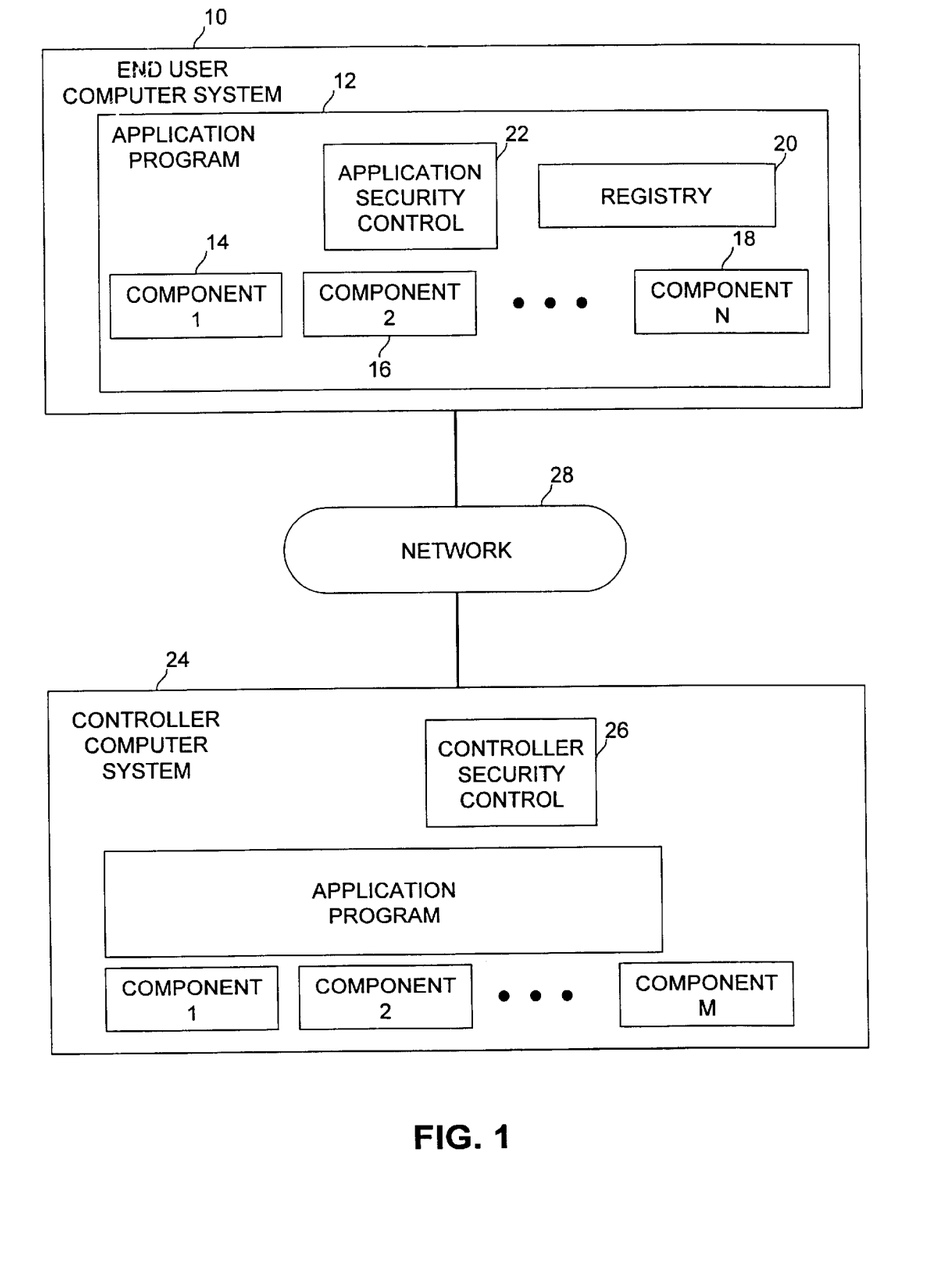
FIG. 1 is a block diagram of an operating environment of an embodiment of the present invention.

FIG. 1 is a block diagram of an operating environment of an embodiment of the present invention. An end user's computer system 10 executes an application program 12, previously licensed from a software developer (not shown). The end user's computer system may be a personal computer (PC), engineering workstation, mini-computer, network computer, or other computing device. The application program is representative of any computer software written in any programming language and licensed by a user to perform desired functions on the user's computer system. In some embodiments, the programming language and object oriented technology used may be one or more of C++, Java, Visual Basic, COM, Distributed COM (DCOM), ActiveX, and the like. One skilled in the art will appreciate that other programming technologies and languages may also be used. Application program 12 may include one or more components, labeled 14, 16, and 18. Each component provides the application program with some desired functionality once the component is communicatively coupled to the application program. This coupling is also known as performing a "snap-in" or "plug-in" of the component. The components may be distributed and licensed to the end user along with the application program, or individual components may be subsequently communicated to the end user's computer system for use with the application program as needed. The end user initiates execution of application program 12 by computer system 10 to perform the functions provided by the application program and the linked components 14, 16, and 18.

Application program 12 comprises a registry 20. The registry stores information regarding the application program and components that have been snapped in for use with the application program. In one embodiment, the components are ActiveX controls and the registry comprises at least the global unique identifiers (GUIDs) of the ActiveX controls. For ActiveX controls using dynamic linked libraries (DLLs), registration may be accomplished by calling a DLLRegisterServer()) method in Windows operating system-based computer systems. For non-ActiveX controls when DLLs are not used, registration may be accomplished by specialized executable programs (EXEs) provided for this purpose. Application program 12 also comprises application security control function 22, which operates to ensure that in this embodiment only licensed components are used with the application program. Additional information regarding application security control is provided in further detail with reference to FIG. 5 below.

Distribution and security control of the application program and components may be supported by controller computer system 24. The controller computer system may store at least one copy of each of the components and the application program. The components and the application program may also be stored on conventional storage media (not shown) coupled to the computer system or otherwise writable by the computer system, such as compact disk read only memories (CD-ROMs), floppy disks, digital versatile disks (DVDs), magnetic tapes, and the like. The number of components stored in the controller computer system and available for licensing by the end user computer system may be different than the number of components shown in application program 12 of FIG. 1. The controller also includes controller security control 26 according to embodiments of the present invention, which operates in conjunction with application security control 22 resident in the application program 12, and the components 14, 16, and 18, to inhibit unauthorized use of the components.

The controller 24 may be communicatively coupled to the end user computer system 10 by a network 28, such the Internet, by well-known techniques. In this scenario, licensed application programs and components may be transmitted to the end user's computer system over the network. Alternatively, the controller may be operated in a "stand alone" mode, whereby it is not in communication with the network. In this scenario, application programs and components are embodied in any one of several well known storage media and distributed to end users through commercial channels. The controller computer system may be managed by a developer of the application program and components, or other distributor, original equipment manufacturer (OEM), or vendor.

Figure 2:
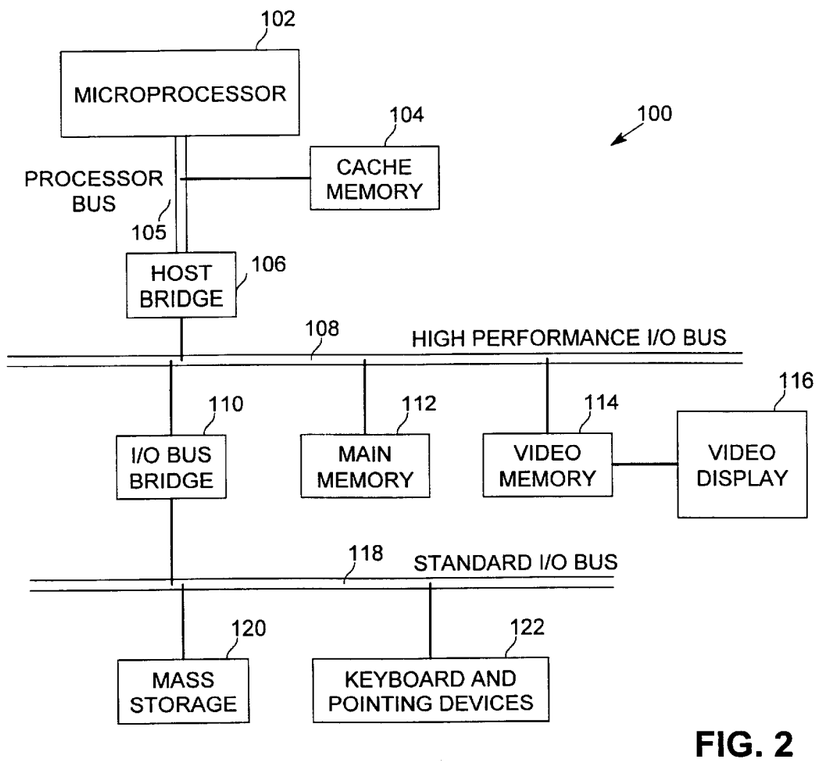
FIG. 2 is a diagram illustrating a sample computer system suitable to be programmed with embodiments of the methods for controlling usage of software components in accordance with the present invention.

FIG. 2 is a diagram illustrating a sample computer system suitable to be programmed with embodiments of the method for controlling usage of software components in accordance with the present invention. Sample computer system 100 may be used, for example, to execute the processing for the methods described herein, both for the end user's computer system and the controller computer system. Sample computer system 100 is representative of computer systems based on the PENTIUM®, PENTIUM® Pro, and PENTIUM® II microprocessors available from Intel Corporation, although other computer systems (including personal computers (PCs) having other microprocessors, engineering workstations and the like) may also be used. Sample computer system 100 includes microprocessor 102 and cache memory 104 coupled to each other through processor bus 105. Sample computer system 100 also includes high performance I/O bus 108 and standard I/O bus 118. Processor bus 105 and high performance I/O bus 108 are bridged by host bridge 106, whereas high performance I/O bus 108 and standard I/O bus 118 are bridged by I/O bus bridge 110. Coupled to high performance I/O bus 108 are main memory 112 and video memory 114. Coupled to video memory 114 is video display 116. Coupled to standard I/O bus 118 are mass storage 120, and keyboard and pointing devices 122.

These elements perform their conventional functions well known in the art. In particular, mass storage 120 may be used to provide permanent storage for the executable instructions for embodiments of methods for controlling usage of software components in accordance with the present invention, whereas main memory 112 is used to temporarily store the executable instructions of embodiments of the methods for controlling usage of software components in accordance with the present invention during execution by microprocessor 102.

Figure 3:
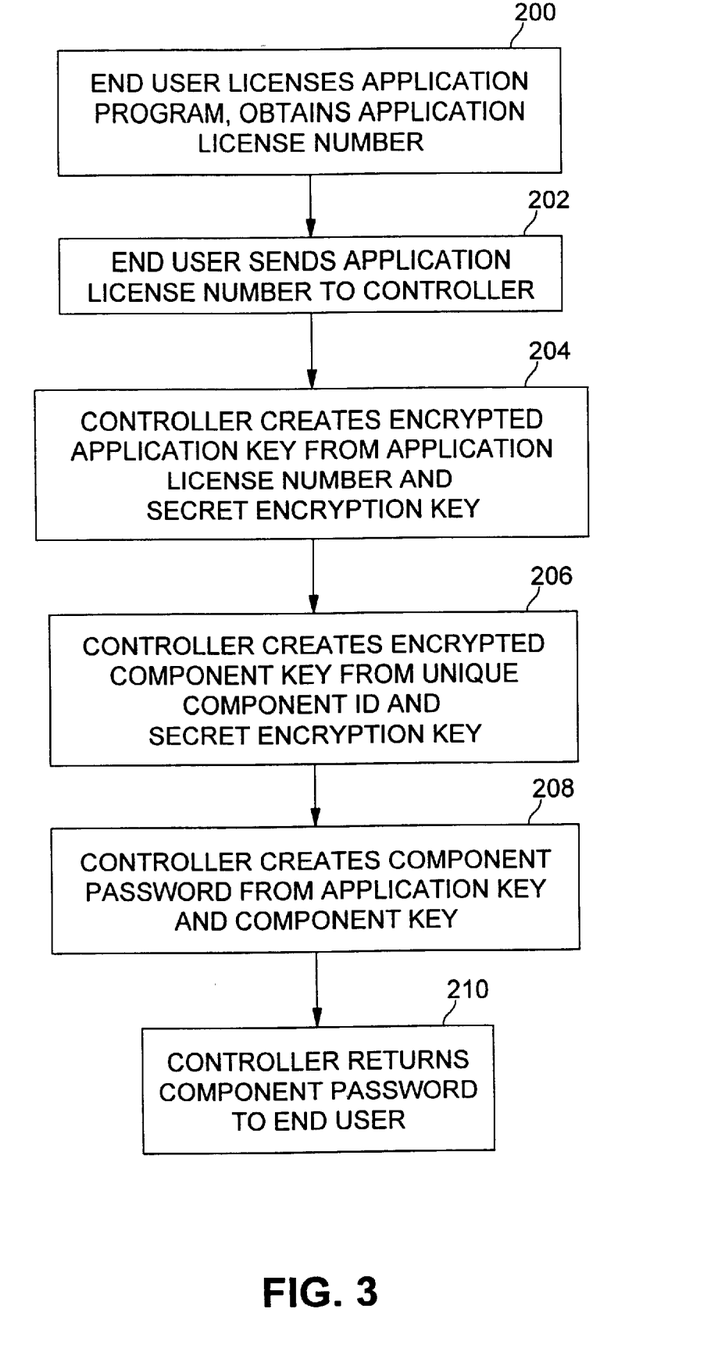
FIG. 3 is a flow diagram for creating a component password according to an embodiment of the present invention.

In embodiments of the present invention, data security for individually available components is premised on having the end user provide the license number of the application program (or other unique identifier or secret value) when licensing a snap-in component. FIG. 3 is a flow diagram for creating a component password according to an embodiment of the present invention. At block 200, an end user licenses an application program and obtains an associated unique identifier, such as an application license number, from the developer or vendor of the application program. The application license number may be given to the end user only after the end user has agreed to the terms of a software license and completed payment obligations. In one embodiment, the application program is obtained from the controller computer system via a network (e.g., the Internet). Subsequently, when the end user desires to obtain a selected component for use with the application program, the end user sends the application program license number to the controller security control operation of the controller computer system at block 202, along with an indication of which component is requested. This communication may be conducted electronically (such as via the Internet, for example), or by other techniques such as by telephone. Next, at block 204, controller security control creates an encrypted application key, using at least a portion of the application license number and a secret encryption key as input data. In one embodiment, the application key is encrypted according to the well known Data Encryption Standard (DES) technique, although other encryption techniques may also be employed. The secret encryption key comprises a predetermined data value known by the controller security control operation of the controller computer system, but it is not known by any end user. In embodiments using the DES technique or other two key encryption processes, the secret encryption key is a private key. In this manner, in this particular embodiment the encrypted application key is associated with the specific copy of the application program that the requesting end user has previously been authorized to use. Of course, the invention is not restricted in scope in this respect.

At block 206, the controller security control operation creates an encrypted component key, using an unique identifier for the requested component and the secret encryption key as input data. As with generation of the application key, in one embodiment, the component key may be encrypted according to the well known DES technique, although other encryption techniques may also be employed. In one embodiment, if the requested component is an ActiveX control, a global unique identifier (GUID) for the component may be used as the identifier. In this manner, the encrypted component key is uniquely associated with a specific copy of the requested component. Next, at block 208, the controller security control creates an encrypted component password, by combining the encrypted application key and the encrypted component key and encrypting the resulting combination. Again, in one embodiment, the DES encryption technique is used, although other encryption techniques may also be employed.

Figure 4:
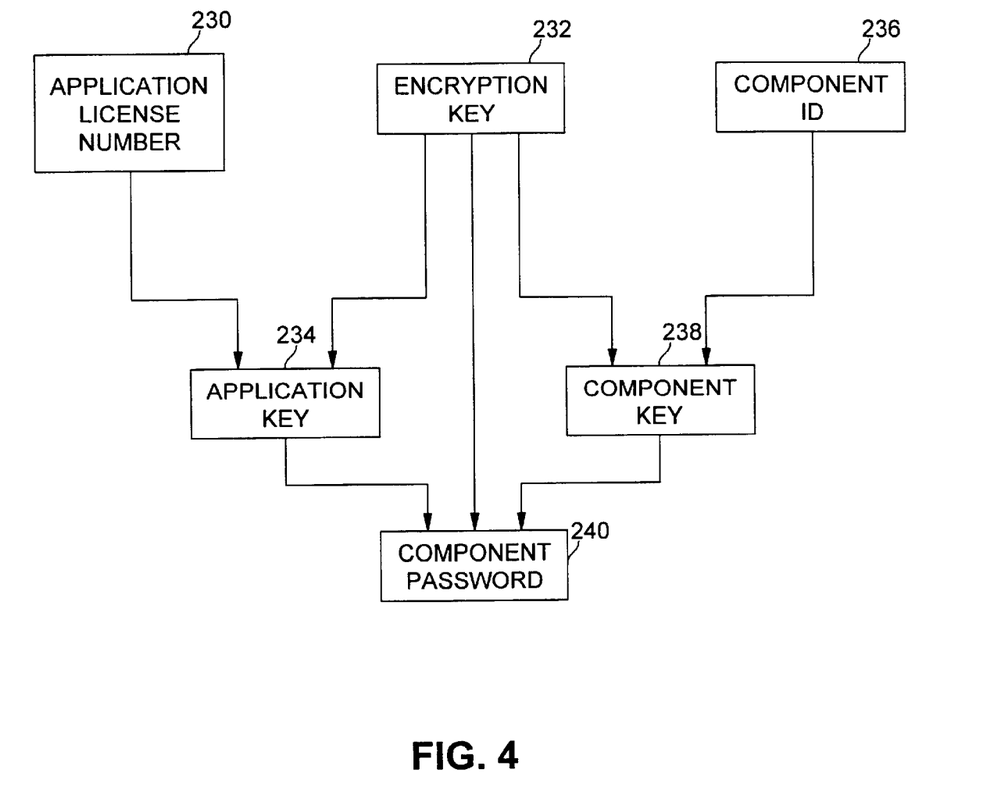
FIG. 4 is a diagram illustrating a combination of data items used in producing a component password in accordance with an embodiment of the present invention.

The component password now represents the combination of the licensed application program and the requested component identifiers. FIG. 4 is a block diagram illustrating a combination of data items used in producing a component password in accordance with an embodiment of the present invention. The application license number 230 provided by the end user is encrypted using the secret encryption key 232 to produce application key 234. Similarly, component identifier (ID) 236 is encrypted with the secret encryption key 232 to produce component key 238. The application key and the component key are then encrypted with the secret encryption key to produce the component password 240. In another embodiment, different encryption keys may be used to generate the application key, the component key, and the component password.

In another embodiment of the present invention, generation of the component password may be simplified. In this embodiment, at least a portion of the application license number 230 may be combined with the component ID 236 to form the component password. In this case, the controller computer system creates the component password by encrypting all or part of the application license number 230 by using the unique component ID 236 as the key instead of encryption key 232. Any one of a variety of other combination techniques may also be employed within the scope of the present invention.

The component password may then be returned by the controller security control operation to the end user at block 210 of FIG. 3. In some embodiments, this communication may be conditioned upon completion of a payment obligation. The requested component may then be transferred to the end user computer system by any available technique (such as via the Internet, for example). The component password may be transferred to the end user as a file embedded in the requested component, for example. In this way, the end user does not need to enter the component password into the end user computer system, nor does the end user even have to know the component password.

Figure 5:
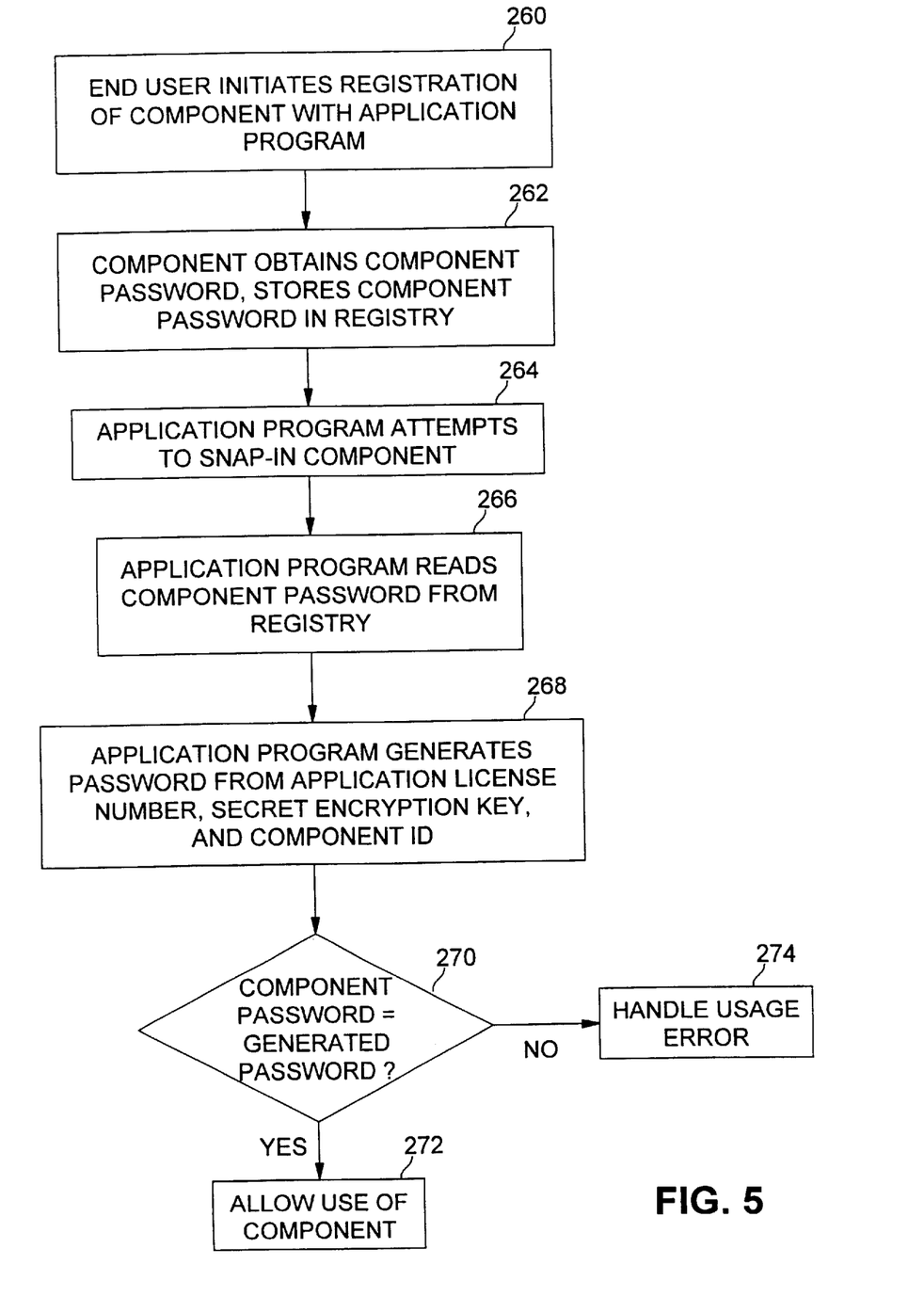
FIG. 5 is a flow diagram illustrating registering and authenticating a component according to embodiments of the present invention.

When the end user receives the requested component, the component may be registered in the registry 20 for use with the application program 12. FIG. 5 is a flow diagram illustrating registering and authenticating a component according to embodiments of the present invention. These operations may be performed by application security control 22, which may be part of application program 12 of FIG. 1, although the invention is not limited in scope in this respect. At block 260, the end user initiates registration of a component with the application program. When an end user computer system receives a component, the component may be in a compressed or "zipped" format, although the invention is not limited in scope in this respect. The end user then decompresses or "unzips" the zipped component. The component may be in the form of a self-extracting zip file (which decompressed itself), or the end user may execute an "unzip" program to decompress the component. Once the component is decompressed, the end user may run a set-up or install procedure to install the components on the end user computer system, although the invention is not limited in scope in this respect. In embodiments of the present invention, this involves a snap-in or plug-in operation (such as a procedure call to the Active X snap-in layer class, for example). Next, at block 262, the component, as part of the snap-in operation, obtains the component password and stores it in the registry. Note that in this embodiment the component password is placed in the registry at registration time, not at the execution time of the application program, although the invention is not limited in scope in this respect.

The component also stores the component's global unique identifier (GUID) in the registry in this embodiment. In one embodiment, if the component password is stored in a text or other file previously transferred to the end user computer system with the component, the component reads the file to obtain the component password. In another embodiment, the end-user may be prompted to enter the component password via conventional computer system input techniques (e.g., a user interface dialog window). In either case, if a component password is not obtained, the component may signal an error to the end user and cease operating. Alternatively, the component may be allowed to operate without a valid component password. Likewise, in other embodiments other actions may result.

The application program attempts to snap-in the component at block 264. When the application program runs, it snaps in registered components. This is different than the registration process, since a component in this particular embodiment is first registered before it is snapped-in to an application program. The application program may perform the snap-in operations at application start-up time, or it may check for new components "on the fly" while the application program is executing. At block 266, the application program reads the component password for the component from the registry. If the component password for the component is not in the registry, then an error signal may be presented to the end user and snap-in processing may be ended. The component password is identified in the registry as being associated with the component by the component's global unique identifier (GUID). Once the application program has the component password, at block 268 the application program uses its license number (embedded within the application program) and the unique identifier of the component (obtained from registry) to generate a password using the technique discussed above with reference to FIGS. 3 and 4 and the secret encryption key. The secret encryption key may be "hard-coded" or pre-set in the application program by the software developer, although the invention is not limited in scope in this respect.

At block 270, the application program compares the password it generated with the component password retrieved from the registry. If the component password matches the generated password, then the application program completes the snap-in process and allows use of the component at block 272. If the component password does not match the generated password, the component is not registered to operate with the application program. In this case, the usage error is handled at block 274. Error handling may include removing the component from the end user computer system and deleting the component information from the registry, and sending a message to the end user requesting the user to license the component.

Embodiments of the present invention allow software developers to structure portions of application programs as components and to market the application programs and components in a variety of ways. In one approach, the application program and all associated snap-in components may be marketed and licensed together, in which case the component password may be generated at the time of installation of the application program. For this example, all components may be authorized and operate immediately after installation. In another approach, the application program initially has no snap-in components and any or all of the components may be distributed and licensed separately. The only change between the application program versions in these cases is the embedded install program. With embodiments of the present invention, there may be no other impact to application program testing or development.

Embodiments of the present invention also reduce the possibilities that illegal copies may be made of a software developer's components. In the case of network licensed software, an end-user may have many client system applications with the same license number, and perhaps many more client system applications, each with a different license number. Embodiments of the present invention produce the result that users should purchase a component for each license number they own. Without this mechanism, they might purchase one component and install it on all of their computer systems, resulting in the loss of revenue for the software developer.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. A method of generating a password for controlling usage of a selected copy of a software plug-in component by a selected copy of an authorized application program on a selected computer system comprising:

creating a first key from an identifier of the selected copy of the authorized application program;

creating a second key from an identifier of the selected copy of the software plug-in component; and creating the password from the first and second keys by encrypting a combination of the first key and the second key with a secret encryption key, thereby binding authorized usage of the selected copy of the software plug-in component to the selected copy of the authorized application program on the selected computer system.

2. The method of claim 1, wherein creating the first key comprises encrypting at least a portion of the application program identifier with a secret encryption key.

3. The method of claim 1, wherein creating the second key comprises encrypting at least a portion of the component identifier with a secret encryption key.

4. A method of controlling usage of a selected copy of a software plug-in component with a selected copy of an authorized application program having an identifier on a selected computer system comprising:

providing the application program identifier;

receiving the selected copy of the software plug-in component, a component identifier and a first password associated with a combination of the selected copy of the authorized application program and the selected copy of the software plug-in component;

registering the selected copy of the software plug-in component with the selected copy of the authorized application program by storing the component identifier and the first password in a registry on the selected computer system;

generating a second password from the application program identifier and the received component identifier;

comparing the first password from the registry and the second password; and allowing use of the selected copy of the software plug-in component with the selected copy of the authorized application program on the selected computer system when the first password matches the second password.

5. The method of claim 4, wherein generating the second password comprises:
   creating a first key from the application program identifier;
   creating a second key from the received component identifier; and
   creating the second password from the first and second keys.

6. The method of claim 5, wherein creating the first key comprises encrypting at least a portion of the application program identifier with a secret encryption key.

7. The method of claim 5, wherein creating the second key comprises encrypting at least a portion of the component identifier with a secret encryption key.

8. The method of claim 5, wherein creating the second password comprises encrypting a combination of the first key and the second key with a secret encryption key.

9. The method of claim 4, wherein generating the second password comprises encrypting at least a portion of the application program identifier with the component identifier as an encryption key.

10. An article comprising a machine readable storage medium that stores instructions that when executed cause a computer system to generate a password for controlling usage of a selected copy of a software plug-in component by a selected copy of an authorized application program on a selected computer system by creating a first key from an identifier of the selected copy of the authorized application program, creating a second key from an identifier of the selected copy of the software plug-in component, and creating the password from the first and second keys by encrypting a combination of the first key and the second key with a secret encryption key, thereby binding authorized usage of the selected copy of the software plug-in component to the selected copy of the authorized application program on the selected computer system.

11. An article comprising a machine readable storage medium that stores instructions that cause a first computer system to provide an application program identifier of a selected copy of an authorized application program to a second computer system, receive a selected copy of a software plug-in component, a component identifier and a first password associated with a combination of the selected copy of the authorized application program and the selected copy of the software plug-in component from the second computer system, register the selected copy of the software plug-in component with the selected copy of the authorized application program by storing the component identifier and the first password in a registry on the first computer system, generate a second password from the application program identifier and the received component identifier, compare the first password from the registry and the second password, and allow use of the selected copy of the software plug-in component with the selected copy of the authorized application program on the first computer system when the first password matches the second password.

12. A method of controlling usage of a selected copy of a software plug-in component with a selected copy of an authorized application program resident in a computer system comprising:
    generating a first password from an application program identifier of the selected copy of the authorized application program and an identifier of the selected copy of the software plug-in component;
    registering the selected copy of the software plug-in component with the selected copy of the authorized application program by storing the component identifier and the first password in a registry on the computer system;
    generating, by the selected copy of the authorized application program, a second password from the application program identifier and the component identifier from the registry;
    comparing the first password from the registry and the second password; and
    allowing use of the selected copy of the software plug-in component with the selected copy of the authorized application program on the computer system when the first password matches the second password.

13. The method of claim 12, further comprising communicating the selected copy of the software plug-in component, the component identifier, and the first password to the computer system prior to the registering act.

14. The method of claim 13, wherein generating the second password comprises:
    creating a third key from the application program identifier;
    creating a fourth key from the communicated component identifier; and
    creating the second password from the third and fourth keys.

15. The method of claim 14, wherein creating the third key comprises encrypting at least a portion of the application program identifier with a secret encryption key.

16. The method of claim 14, wherein creating the fourth key comprises encrypting at least a portion of the component identifier with a secret encryption key.

17. The method of claim 14, wherein creating the second password comprises encrypting a combination of the third key and the fourth key with a secret encryption key.

18. The method of claim 12, wherein generating the first password comprises:
    creating a first key from the application program identifier;
    creating a second key from the component identifier; and
    creating the first password from the first and second keys.

19. The method of claim 18, wherein creating the first key comprises encrypting at least a portion of the application program identifier with a secret encryption key.

20. The method of claim 18, wherein creating the second key comprises encrypting at least a portion of the component identifier with a secret encryption key.

21. The method of claim 18, wherein creating the first password comprises encrypting a combination of the first key and the second key with a secret encryption key.

22. The method of claim 12, wherein generating the first password comprises encrypting at least a portion of the application program identifier with the component identifier as an encryption key.

23. In a system having an end user computer system coupled to a controller computer system, the end user computer system having an application program identified by an identifier, a method of controlling usage of a software component with the application program comprising:
    obtaining, by the controller computer system, the application program identifier;
    generating a first password from the application program identifier and an identifier of the component;
    communicating the component, the component identifier, and the first password from the controller computer system to the end user computer system;

storing, by the end user computer system, the component identifier and the first password in a registry of the application program;

generating, by the application program, a second password from the application program identifier and the component identifier from the registry;

comparing the first password from the registry and the second password; and allowing use of the component with the application program by the end user computer system when the first password matches the second password.

24. An article comprising: a machine readable storage medium that stores instructions that cause at least one computer system to generate a first password from an application program identifier of a selected copy of an authorized application program and an identifier of a selected copy of a software plug-in component, to register the selected copy of the software plug-in component for use with the selected copy of the authorized application program by storing the component identifier and the first password in a registry on the at least one computer system, to generate a second password from the application program identifier and the component identifier from the registry, to compare the first password from the registry and the second password, and to allow use of the selected copy of the software plug-in component with the selected copy of the authorized application program on the at least one computer system when the first password matches the second password.

* * * * *